(12) United States Patent
Carlin et al.

(10) Patent No.: US 6,697,843 B1
(45) Date of Patent: Feb. 24, 2004

(54) METHOD AND SYSTEM FOR HYBRID MAIL WITH DISTRIBUTED PROCESSING

(75) Inventors: Paul N. Carlin, McLean, VA (US); Eugene C. Johnson, Chevy Chase, MD (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 09/549,161

(22) Filed: Apr. 13, 2000

(51) Int. Cl.[7] .............................................. G06F 15/16
(52) U.S. Cl. ...................... 709/206; 705/406
(58) Field of Search ............................. 709/205, 206; 705/406

(56) References Cited

U.S. PATENT DOCUMENTS

| | | |
|---|---|---|
| 4,760,534 A | 7/1988 | Fougere et al. |
| 4,796,196 A | 1/1989 | Durst, Jr. et al. |
| 4,797,830 A | 1/1989 | Baggarly et al. |
| 4,797,832 A | 1/1989 | Axelrod et al. |
| 4,800,505 A | 1/1989 | Axelrod et al. |
| 4,800,506 A | 1/1989 | Axelrod et al. |
| 4,809,187 A | 2/1989 | Adams |
| 4,853,869 A | 8/1989 | Durst, Jr. et al. ............ 364/478 |
| 4,862,386 A | 8/1989 | Axelrod et al. |
| 5,039,075 A | 8/1991 | Mayer |
| 5,050,078 A | 9/1991 | Sansone ...................... 364/406 |
| 5,051,914 A | 9/1991 | Sansone et al. |
| 5,058,030 A | 10/1991 | Schumacher |
| 5,060,165 A | 10/1991 | Schumacher et al. |
| 5,068,797 A | 11/1991 | Sansone et al. |
| 5,072,401 A | 12/1991 | Sansone et al. |
| 5,077,694 A | 12/1991 | Sansone et al. |
| 5,144,562 A | 9/1992 | Stikkelorum et al. |
| 5,161,109 A | 11/1992 | Keating et al. |
| 5,264,665 A | 11/1993 | Delfer, III |
| 5,283,752 A | 2/1994 | Gombault et al. |

(List continued on next page.)

FOREIGN PATENT DOCUMENTS

| | | |
|---|---|---|
| DE | 44 02 856 A1 | 8/1995 |
| DE | 197 54 508 A1 | 6/1999 |

OTHER PUBLICATIONS

Copy of International Search for International Application No. PCT/US03/05709 completed Apr. 26, 2003 (mailed on May 22, 2003).

Copy of Supplementary Partial European Search Report for European Application No. 01924948.1, completed May 15, 2003 (mailed on Jun. 5, 2003).

Primary Examiner—Saleh Najjar
(74) Attorney, Agent, or Firm—Alson & Bird LLP

(57) ABSTRACT

A method and system are provided for distributed processing of hybrid mail. There are gateways, that collect and store variable data. There are also system management sites, having storage for fixed data. Also provided are mail production sites. The gateways may be dedicated or shared among customers, and collect variable data for mailings from the customers. The gateways group the data by geographic location, and transmit the variable data to one of the appropriate geographically located mail production facilities. The mail production facility sends a transmission to the system management site, responsive to receiving variable data from the gateway, requesting and receiving the corresponding fixed data. The mail production sites produce mail pieces, including said fixed data and the corresponding variable data. The finished mail pieces are further sorted and produced so as to take advantage of, for example, geographically grouped mailings.

17 Claims, 8 Drawing Sheets

U.S. PATENT DOCUMENTS

| | | |
|---|---|---|
| 5,317,654 A | 5/1994 | Perry et al. |
| 5,329,102 A | 7/1994 | Sansone |
| 5,377,120 A | 12/1994 | Humes et al. |
| 5,388,049 A | 2/1995 | Sansone et al. |
| 5,426,594 A | 6/1995 | Wright et al. |
| 5,454,038 A | 9/1995 | Cordery et al. |
| 5,519,624 A | 5/1996 | Hidding |
| 5,586,036 A * | 12/1996 | Pintsov ................ 705/408 |
| 5,648,916 A | 7/1997 | Manduley ............ 364/514 A |
| 5,737,729 A | 4/1998 | Denman ................ 705/401 |
| 5,742,932 A | 4/1998 | Levitsky |
| 5,781,634 A | 7/1998 | Cordery et al. |
| 5,781,901 A | 7/1998 | Kuzma |
| 5,793,972 A * | 8/1998 | Shane .................. 709/219 |
| 5,802,503 A | 9/1998 | Sansone ................ 705/401 |
| 5,818,724 A | 10/1998 | Brewster, Jr. et al. |
| 5,822,739 A | 10/1998 | Kara ..................... 705/410 |
| 5,873,073 A | 2/1999 | Bresnan et al. ......... 705/410 |
| 5,918,220 A | 6/1999 | Sansone et al. ......... 705/408 |
| 5,923,013 A | 7/1999 | Suzuki et al. |
| 5,953,427 A | 9/1999 | Cordery et al. |
| 5,983,264 A * | 11/1999 | Gardner ................ 709/206 |
| 6,026,385 A | 2/2000 | Harvey et al. |
| 6,101,320 A | 8/2000 | Schuetze et al. |
| 6,185,604 B1 | 2/2001 | Sekiguchi |
| 6,256,624 B1 * | 7/2001 | Pollard et al. ............ 707/3 |
| 6,285,777 B2 * | 9/2001 | Kanevsky et al. ....... 382/101 |
| 6,463,354 B1 | 10/2002 | Pintsov |
| 6,522,985 B1 | 2/2003 | Swoboda et al. |
| 2002/0042808 A1 | 4/2002 | Smith et al. |
| 2002/0087417 A1 | 7/2002 | Sawada |
| 2003/0004892 A1 | 1/2003 | Miyake |

\* cited by examiner

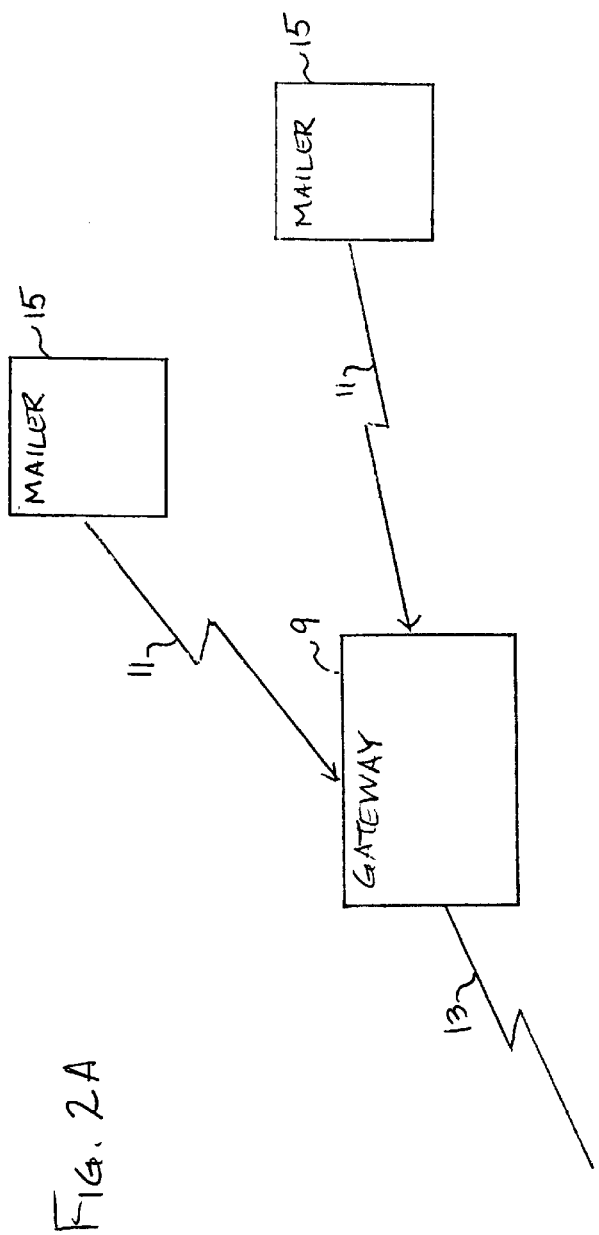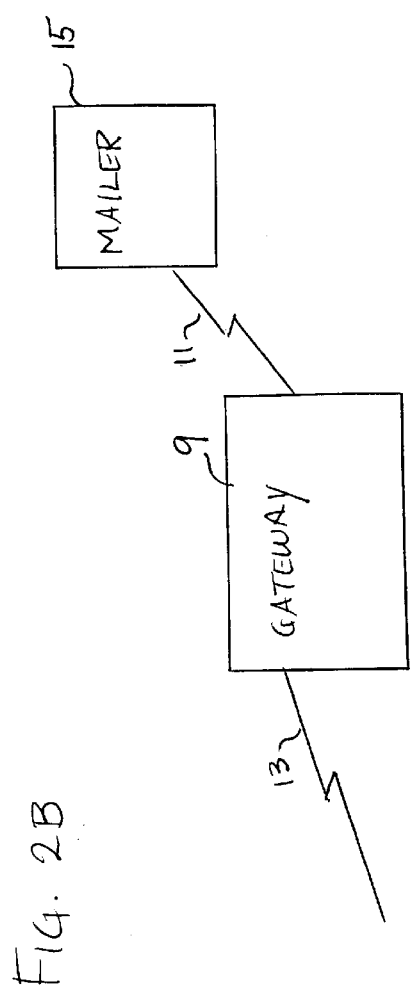

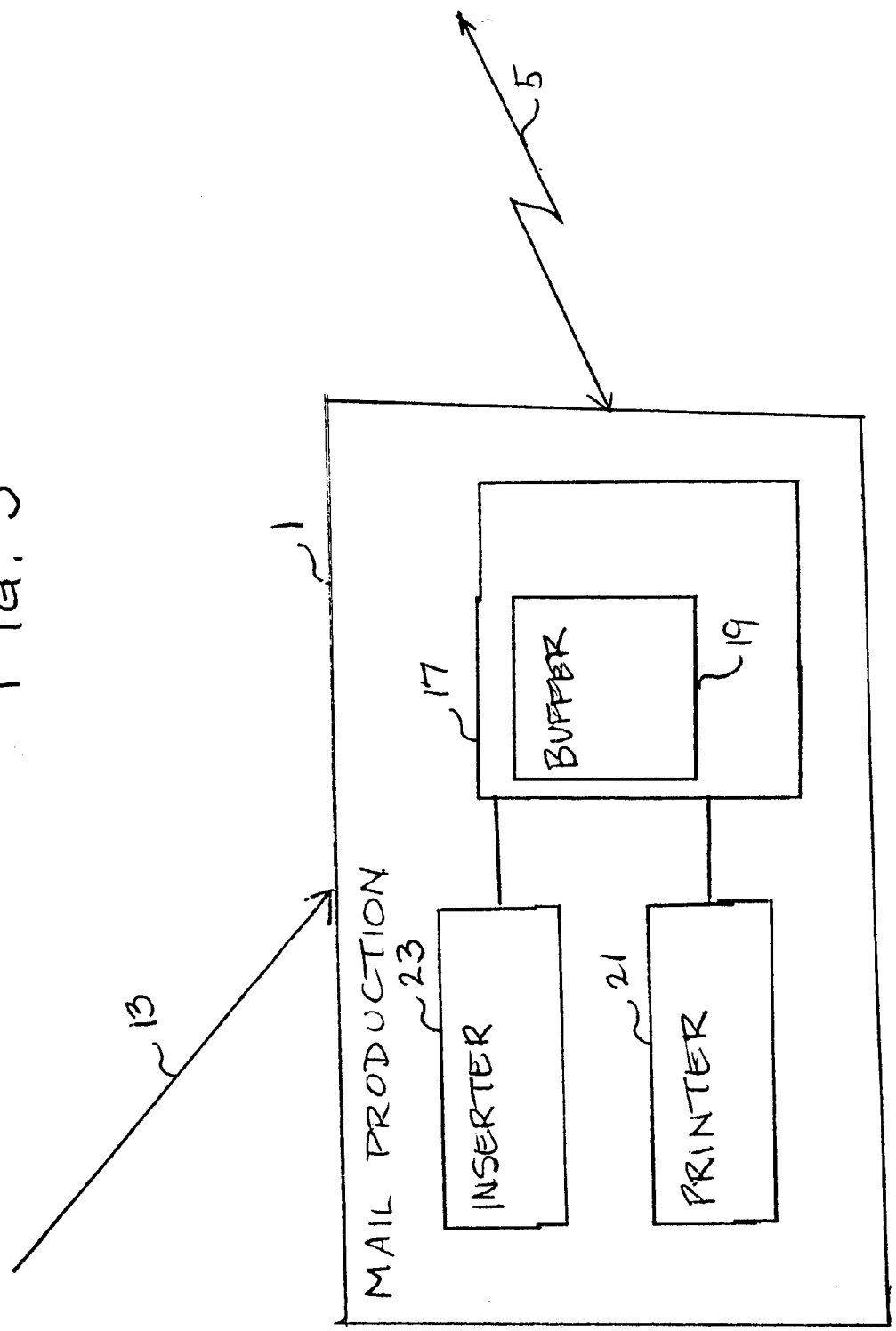

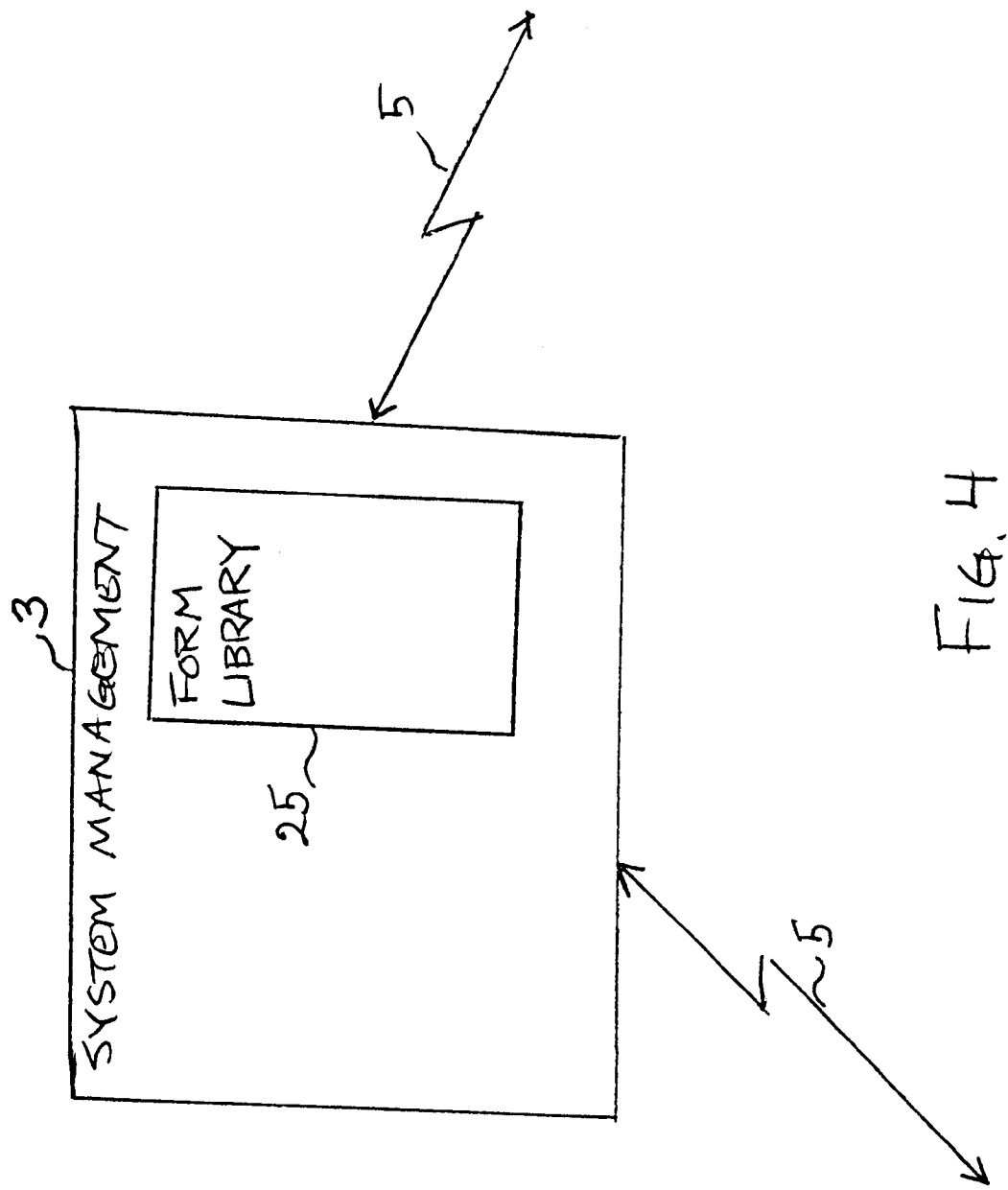

METHOD AND SYSTEM FOR HYBRID MAIL WITH DISTRIBUTED PROCESSING

BACKGROUND OF THE INVENTION

1. Field of the Invention

The present invention relates to distributed hybrid mail. More particularly, it relates to hybrid mail transmitted electronically and using multiple distributed mail processing centers.

2. Description of the Related Art

Hybrid mail has been utilized since about 1970. It consists of variable data and fixed information. Variable data includes that which varies from letter to letter, such as name and address; fixed information includes, for example, the format of the letter and the content of the letter to be created in the computer. Hybrid mail is traditionally produced using a central facility. Most of these central facilities typically utilize a large main frame computer at the central facility to control the processing of producing hybrid mail.

Conventionally, a message that is intended to become a part of a batch of hybrid mail for a particular mass mailing is input, processed at the main frame or central computer, and distributed in a spoke and hub method from the central computer to print facilities. The central computer matches variable data with the fixed information for the hybrid mail. The entire hybrid mail piece, including all of the fixed and variable information, is created in the central computer as an electronic file which is then used to produce the finished mail piece.

In certain conventional systems, the entire electronic file is subsequently sent to a distributed site for production. Each of these electronic files consume large amounts of data. Unfortunately, much of the data in each individual hybrid mail piece is replicated. Conventionally, each of those finished mail pieces in that batch are then pre-sorted and mailed.

It has been observed that the fixed data that is included in a hybrid mail piece constitutes about seventy percent (70%) of a letter. When considering a bulk mailing of hybrid mail, this is a very large amount of redundant data. The variable data is about thirty percent (30%) of the information.

U.S. Pat. No. 5,802,530, Sansone, discloses one method for channeling traffic in a mail system. Here, a piece of digitized mail is channeled along an optimal path into an intended destination. Note that there is no provision for eliminating duplicate data. U.S. Pat. No. 5,918,220, Sansone, also discusses a way of passing parameters related to hybrid mail to a data processing system for assembly of the finished mail piece. Again, unfortunately, no provision is made for eliminating duplicate data.

Traditionally, hybrid mail necessitates the electronic storage of forms to be used in producing the finished piece. This can cause the inherent uncertainties of maintaining and updating several copies of forms, especially if distributed storage is utilized.

Conventional systems, generally speaking, merely automate the process of constructing a finished mail piece. Nevertheless, conventional systems do not provide any way to track a piece of mail as it progresses through production of the hybrid mail piece. Also, since these systems merely automate a formerly manual process, the mail piece is not delivered to the addressee any faster than conventional mail.

None of the available electronic systems for mail do much to efficiently process large quantities of letter mail.

Thus there remains a need for a hybrid mail system which can reduce, minimize or eliminate duplicate data from being transmitted.

BRIEF SUMMARY OF THE INVENTION

It is an object of the present invention to provide improved hybrid mail production with multiple distributed mail processing centers. Optional features are intended to overcome disadvantages of conventional systems.

According to the invention, there is provided a system and method for distributed processing of hybrid mail. It includes at least one gateway, having storage for variable data; at least one system management site, said system management site having storage for fixed data; and at least one mail production site, having (1) an electronic transmission to said system management site responsive to variable data, requesting said fixed data, (2) storage for a plurality of electronic mail pieces, each of said mail pieces including said fixed data and a portion of said variable data, and (3) a print facility for receiving said electronic mail pieces and outputting a hybrid mail.

According to another aspect of the invention, there is provided a system and method for distributed processing of hybrid mail. It includes a gateway for receiving a plurality of variable data, corresponding to a hybrid mail piece, each variable data including an address. The system includes temporary storage having a grouping of said variable data of the plurality, based on the address of the variable data, by geographic location. Also included is a transmission of said grouped variable data to one of a plurality of mail production facilities, each of said mail production facilities corresponding to the geographic location.

According to yet another aspect of the invention, there is provided a system and method for distributed processing of hybrid mail. It includes storage, in a mail production facility, having a plurality of variable data, corresponding to a hybrid mail piece. There is also provided storage, in said mail production facility, having fixed data for said plurality of variable data. Further, there is storage, in said mail production facility, for said fixed data and said variable data, as a plurality of composed data.

These and other objects, features and advantages of the present invention are readily apparent from the following drawings and detailed description.

BRIEF DESCRIPTION OF THE DRAWINGS

The invention is described in connection with the drawings in which:

FIGS. 2A and 2B are a block diagram of a shared customer gateway and a dedicated customer gateway of the distributed hybrid mail system, respectively.

FIG. 3 is a block diagram of the mail production facility of the distributed hybrid mail system.

FIG. 4 is a block diagram of the system management facility of the distributed hybrid mail system.

DETAILED DESCRIPTION OF THE PREFERRED EMBODIMENT

Figure 1:
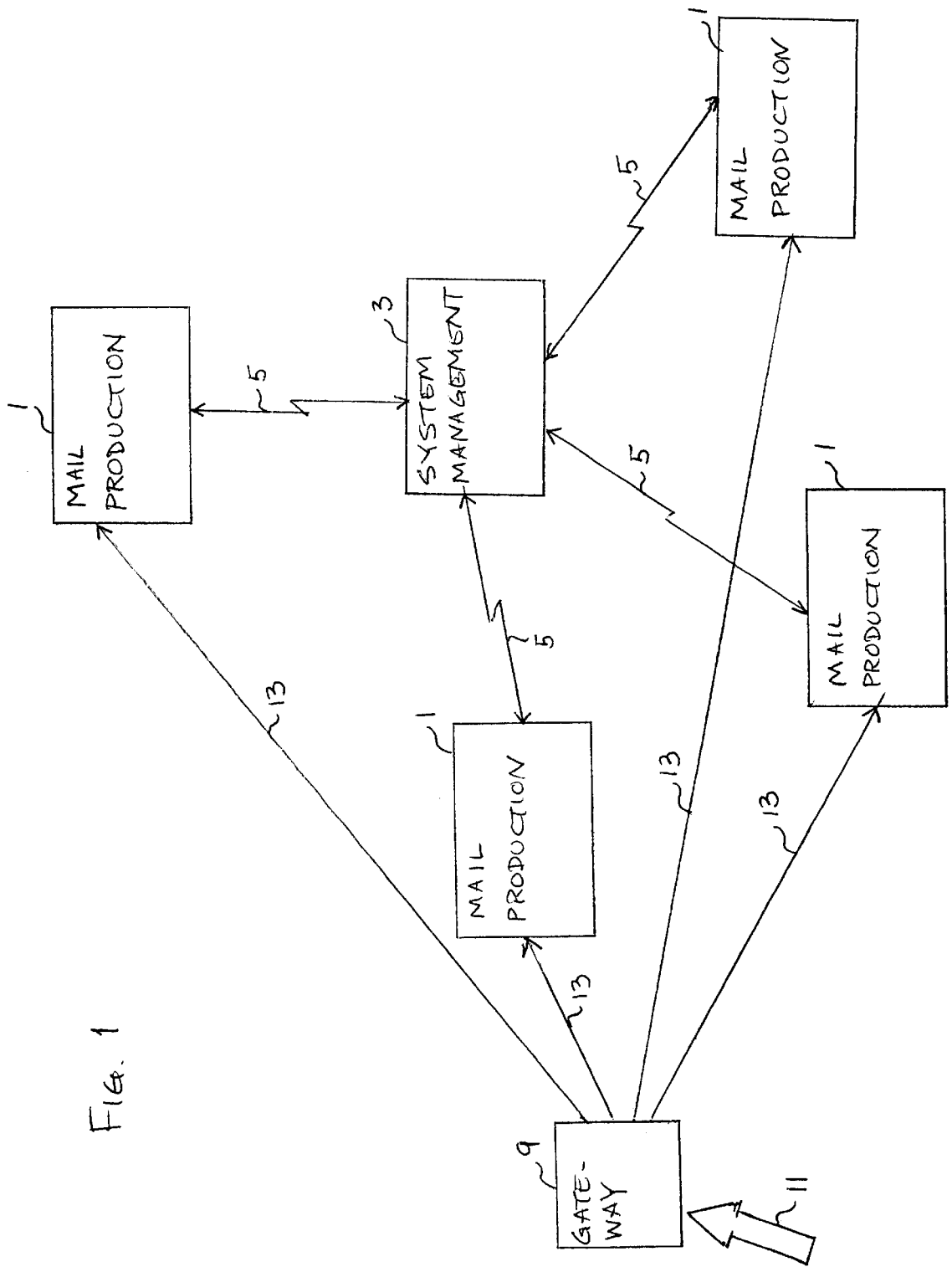
FIG. 1 is a block diagram of a distributed hybrid mail system.

The distributed hybrid mail system, as illustrated in FIG. 1, includes a mail production facility 1, a system management facility 3, and a customer gateway 9.

The following discussion in connection with FIG. 1 provides an overview. Additional details are explained in connection with the subsequent figures. According to the preferred embodiment, the hybrid mail variable data 11 is collected at the customer gateway 9 and transmitted to the mail production facility 1, via any appropriate preferably secure telecommunications connection.

Fixed data is provided to the mail production facility 1 from the system management site 3. Preferably, a dedicated line 5 is provided between the mail production facility 1 and the system management site 3.

The variable data 11 that is collected electronically at the customer gateway 9 is preferably converted, at the gateway, from any input format (e.g., native customer formats, GIF, TIF, etc.) into a standardized format. The standardized format is provided at the point where data is collected, so that subsequent processing in the mail production facility is advantageously dealing with one format. For example, variable data might include street address, city, state, zip code, account number, billing amount, text, etc. Any customer's files might have these in any format. The standardized format would include records and fields, as standardized.

The variable data 11 is grouped at the gateway 9 according to the geographic region for which it is destined. In the U.S., the destination can be readily determined using the U.S. Postal Service's zip code. The variable data 11, which should include a zip code, is then sorted by the three digit zip code at the gateway, and temporarily buffered. Also, according to well known methods, the addresses with or without zip code can be corrected and changed into a ZIP plus 4 format. The corrected, geographically sorted variable data is then transmitted to a geographically appropriate mail production facility.

The mail production facility 1 includes printers, inserters, computers, etc., for converting the electronically transmitted variable and fixed data into the finished mail piece. The mail production facility 1 holds the incoming data for a limited time, advantageously seventy-two (72) hours, and then flushes the data. This above described process is the advantage that eliminates the need for a mail production facility 1 to store forms, which would then cause the inherent uncertainties of multiple copies of forms which must be updated.

The mail production facilities 1 could also be located on a worldwide basis, and hence use international conventions for determining and correcting addresses.

The print site is included at the mail production facility 1. A high speed printer and inserter is provided at the print site. If a printer at a mail production facility becomes unavailable, a feature of the system is that the printing can be distributed to a second mail production facility 1, such as an adjacent geographically related site.

Also, preferably at the mail production facility, the electronic files will be co-mingled and sorted by the five digit zip code prior to printing. Thus, the electronically pre-sorted files can be printed by zip code. It is preferable that sufficient mail pieces are printed by zip code to fill a postal tray, thus taking advantage of various postage discounts and processing efficiencies provided to pre-sort trays.

Preferably, the mail production facility is located fairly close to a post office, to provide for better transportation of finished mail to the post office.

Although the invention has been discussed in connection with hybrid mail, it can also be used for the production of same day documents with other mailing pieces that include color printing, to create with the same electronic data an e-mail message, and an automatic production of a hard copy message whenever the e-mail message is not opened within a flexible predetermined time.

As illustrated in FIG. 1, the customer gateway 9 is preferably located at the customer site. Alternatively, multiple customers could connect to any one gateway 9. The customer gateway 9 provides for the intake of variable data 11, based on customer needs.

The system management facility could be provided as a distributed processor. The distributed facilities could be geographically separated, preferably networked such as by TCP/IP over a fully meshed frame relay network.

The system management facility 3 includes a library of signatures, fonts and logos and any other information which can be pre-stored. The system management facility 3 also includes the stored electronic letter forms in a forms library. Also included at the central system management facility is an optional feature for creating reports of letters which were produced (for example for billing and validation), real time reports to indicate where letters are in the system, and administrative functions relating to payment. This provides the ability to track first class, standard A, postcards, flats, packages, etc.

The preferred system includes a customer gateway 9, preferably one per customer although it is possible that customers can share gateways. The system also provides for multiple mail production facilities 1, located in geographically diverse areas. Also provided is preferably a single system management facility 3, plus a backup system management facility. The system management facility is preferably connected via a dedicated line 5 to each mail production facility 1. The customer gateways 9 connect to a distributed mail production site by any appropriate telecommunications method, in order to transfer the distributed variable data.

The customer gateway is advantageously a high-end personal computer or a UNIX-based computer.

FIGS. 2A and 2B illustrate the customer gateway in more detail. FIG. 2A is a shared customer gateway 9, with multiple mailers 15; whereas FIG. 2B is a dedicated gateway 9, with a single mailer 15. A mailer 15, or customer, has collected variable data, such as customer names, addresses, billing amount, etc. in local electronic files on a computer. The computer at the mailer connects to the gateway 9 via the connection 11. One appropriate connection 11 is TCP/IP over dial-up access. The mailer 15 transmits the variable data to the gateway 9.

The gateway preferably performs a data conversion on the variable data, in order to transform the variable data into a standardized format. Address hygiene is also preferably performed on the addresses in the variable data, according to the usual methods.

Figure 7:
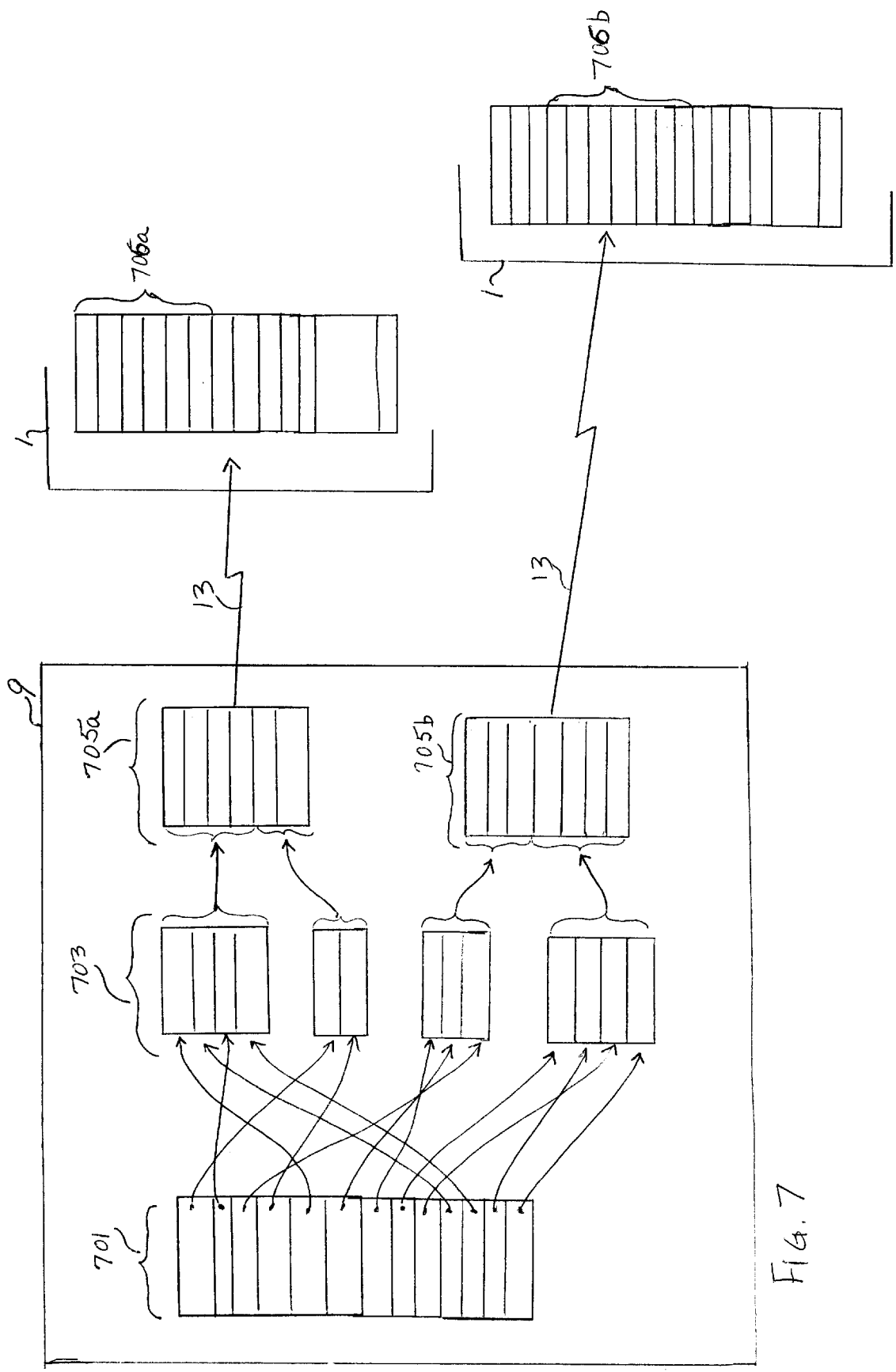
FIG. 7 is a data flow diagram of a variable data in the customer gateway and mail production facility.

Reference is made to FIG. 7. At the gateway 9, the variable data 701 is sorted according to address, by geographic area. The geographic areas correspond to mail production sites. This can readily be performed in two steps. In the U.S., the variable data can be sorted by a 3-digit zip code into sorted data 703. The sorted variable data is then segmented into segmented data 705a, 705b. Segmented means that data for certain zip codes are grouped according to the geographically nearest mail production facilities. (It is possible to group geographically related mail by other methods). Each geographic group of segmented, sorted variable data is transmitted via connection 13 (such as TCP/IP over a fully meshed frame relay network) to the corresponding mail production facility 1 discussed below.

FIG. 3 illustrates the mail production facility 1 in more detail. The mail production facility 1 includes the usual hardware for producing finished mail pieces, such as a printer 21 and an inserter 23, and a high end personal computer or UNIX-based computer print/insert servers 17.

The sorted, segmented variable data is received at the mail production facility over communication line 13. The mail production facility then connects to the system management facility, and requests and receives the fixed data for the mail pieces via communication line 5, preferably a dedicated line. The fixed data resources in the form library 25 are created in advance during a mail piece design phase. The mail piece form is designed and configured in 507 for automatic processing.

Note that, for a batch of mail pieces with the same fixed data, one transmission of fixed data for the entire batch at a particular mail production facility is -sufficient. This system is more efficient for larger batch jobs.

At the mail production facility 1, fixed data is merged with the variable data for each mail piece, to form a fully composed print image. The composed print image is further sorted and then printed for efficient postal distribution. Present post office policy provides incentives for mail sorted by 5-digit zip codes, and placed into full trays. To take advantage of these incentives, as shown in FIG. 7, composed print images 706a,b originated by any particular customer at a gateway 9, are co-mingled with composed print images originated by customers from other gateways. Electronic co-mingling increases the ability to create full trays, for example.

Reference is made back to FIG. 3. Advantageously, the composed mail is buffered in buffer 19 for a limited amount of time. This will permit re-prints in the event of any printing problem. The buffer can be flushed periodically.

The printed mail is then inserted into envelopes in any usual manner. Some appropriate finished hybrid mail hardware include a high speed print system and an inserter.

The finished hybrid mail pieces are then delivered to a mail facility, such as the closest U.S. Post Office.

FIG. 4 illustrates the system management facility 3. The system management facility provides a form library 25. The form library 25 contains electronically stored fixed data. The form library could store data in a data base. The fixed data consists of the resources (fonts, graphics, signatures, logos, overlays, postal and document application rules, etc) used to create the hard copy or electronic mail piece.

When the system management facility 3 receives a request from one of the mail production facilities via communication line 5, it selects fixed data from the form library. There is a tag, for example "job #9", for customer A associated with the fixed data and variable data for the production. During the mail piece design phase, a resource directory structure is developed for each application. Upon composition application execution, a call management structure then directs each resource request to the right directory and file within the resource file server.

The system management facility can track requests for fixed data, and can receive job completion notifications, from the mail production facilities, so that it can identify the location in the system of any particular hybrid mail piece, before, during or after composition.

Note that if a mail production facility becomes unavailable, the transmission to that facility can be rolled over to a different mail production facility.

Note that this method and system avoids the need to physically transport a piece of mail from the initiating customer location to the destination. The elimination of the transportation of mail from the customer to the destination geographic location dramatically decreases the time for delivery of mail.

Figure 5A:
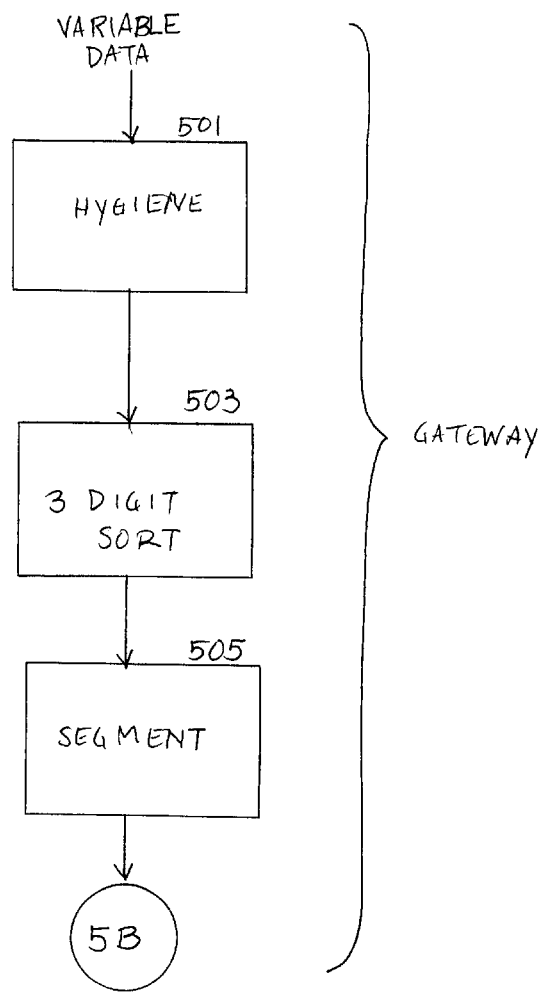
FIGS. 5A and 5B are a flow diagram of the distributed hybrid mail system and method.

FIGS. 5A and B illustrate the flow of the distributed hybrid mail system. At step 501, variable data is input. Step 501 performs hygiene on the data. The hygienic data is input into a 3-digit sort at step 503, and then sorted data is segmented at step 505. The sorted, segmented data is combined with other sorted, segmented variable data. At step 507, the variable data is combined with the fixed data to form composed mail. At step 509, the fully composed print image is electronically sorted (e.g., by five digit zip code). At step 510, the mail is co-mingled. (The co-mingling preferably occurs after the composition, to minimize the possibility of mismatching fixed and variable data.) At step 511, post composition is performed, such as placing the letters in five (5) digit order, and/or creating a print stream. At step 513, the fully composed hybrid print images are submitted for printing and a print job is output.

Figure 5B:
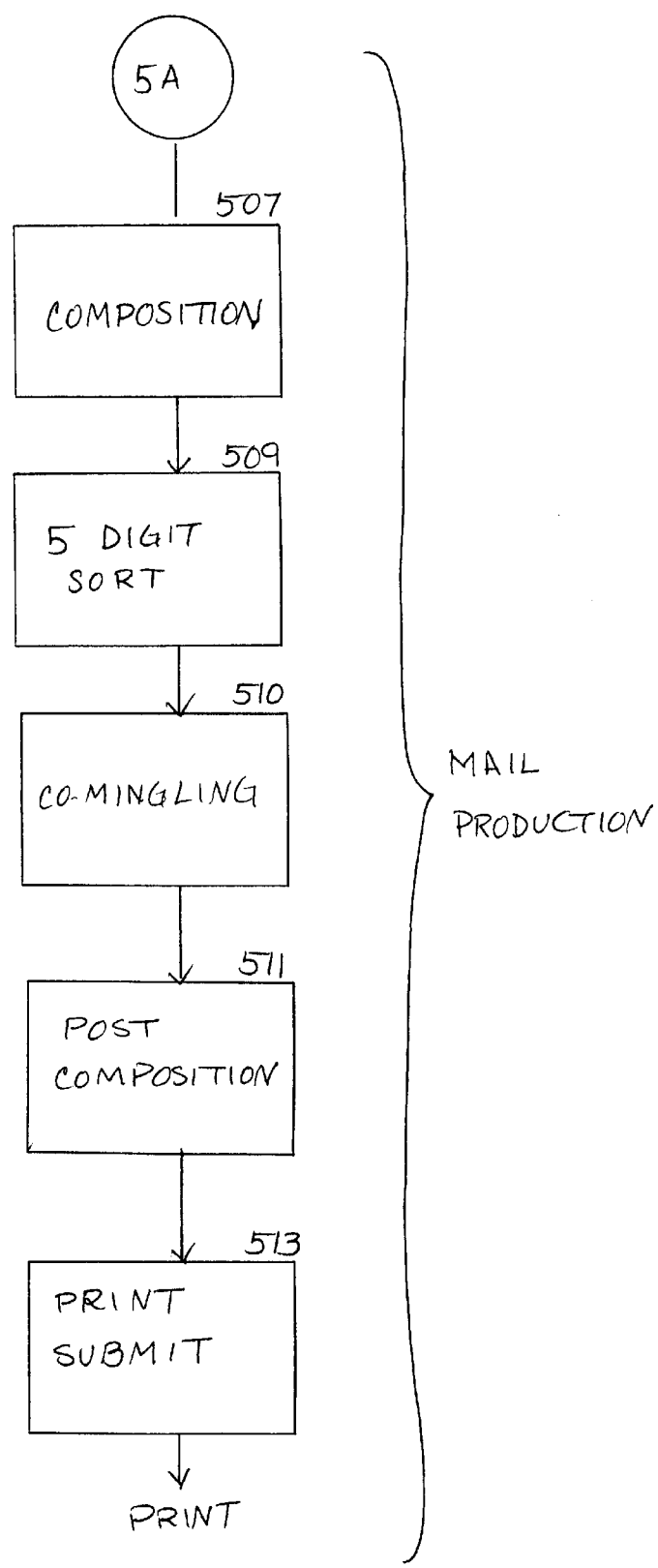

Steps 501, 503 and 505 (FIG. 5A) are advantageously performed at the gateway. Steps 507, 509, 510, 511 and 513 (FIG. 5B) are advantageously performed at the mail production facility, particularly since step 507 fully expands the electronic data.

Figure 6:
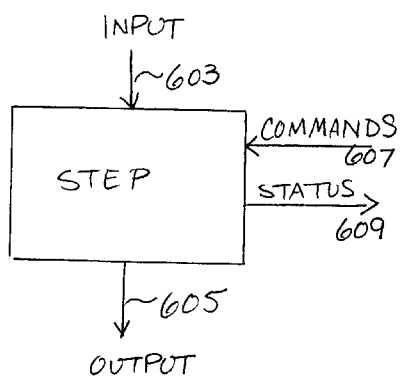
FIG. 6 is a flow diagram of an individual step of FIG. 5.

FIG. 6 illustrates, in more detail, optional features of each step in FIG. 5. Each step 601 has input 603 and output 605. The ability of each step to perform a discrete function is enabled by commands 607 which provide a usual or specific application with a set of precise instructions. Further, each step 601 can transmit a status report 609.

Figure 8:
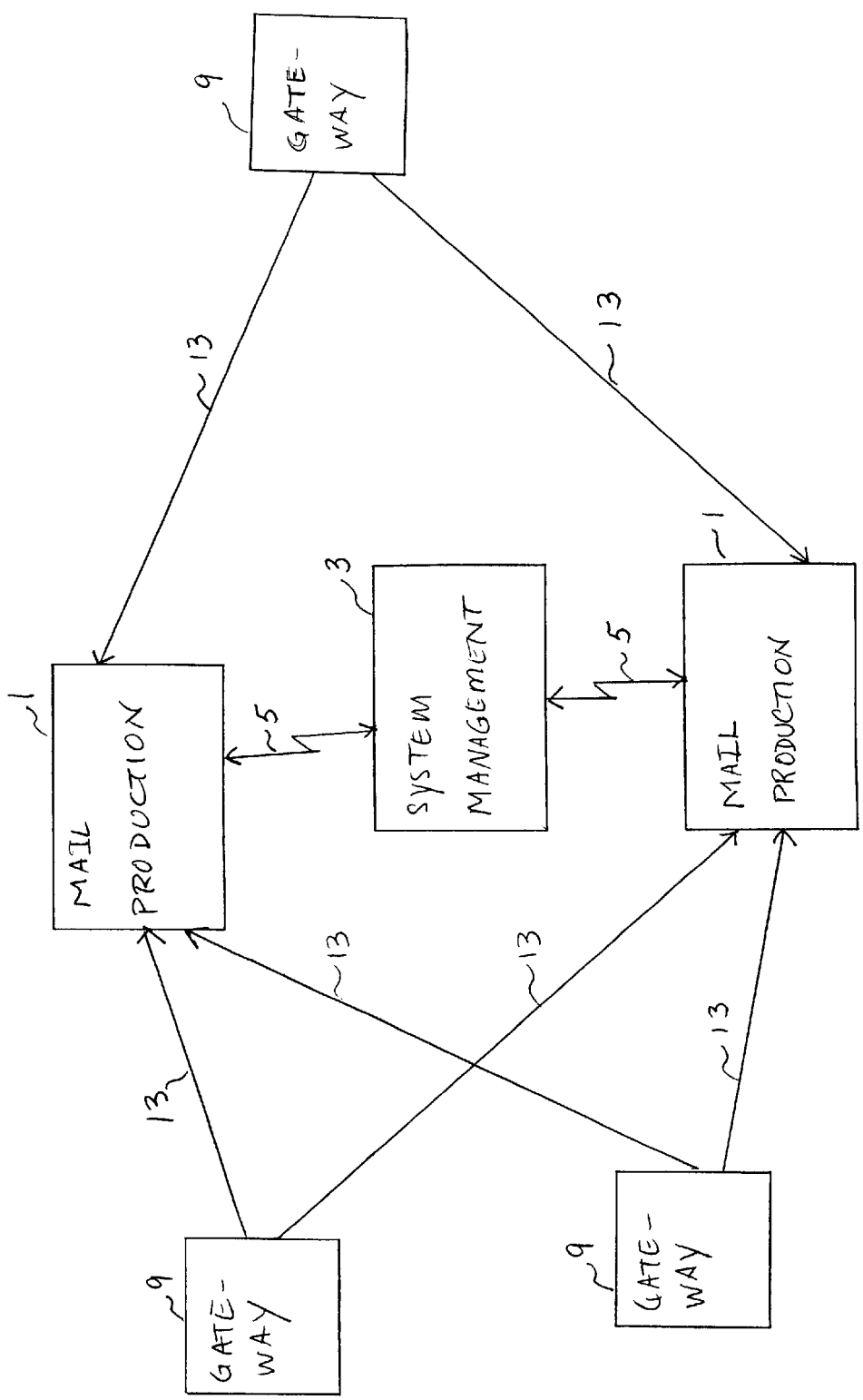
FIG. 8 is another block diagram of a hybrid mail system.

FIG. 8 illustrates another distributed hybrid mail system. Here there are illustrated multiple gateways 9, communicating with multiple mail production sites 1. However, these illustrations are not meant to limit the number of gateways, mail production sites, or system management sites 1. Also note, as here, that one of the gateways is not presently communicating with one of the mail production facilities, due to lack of variable data destined for said mail production facility.

The "sorts" discussed herein could be performed by any appropriate sorting methodology, including use of sorted indexes.

While the preferred mode and best mode for carrying out the invention have been described, those familiar with the art to which this invention relates will appreciate that various alternative designs and embodiments for practicing the invention are possible, and will fall within the scope of the following claims.

What is claimed:

1. A method for distributed processing of hybrid mail, comprising the steps of:

storing, in a system management facility, fixed data for a plurality of hybrid mail pieces to be produced;

receiving, at a gateway located remote from the system management facility, variable data for said plurality of hybrid mail pieces to be produced, wherein each hybrid mail piece to be produced will be defined by said fixed data and a portion of said variable data;

transmitting the variable data from the gateway to a mail production facility located remote from the gateway;

transmitting, from the mail production facility to the system management facility, a request for said fixed data;

transmitting, responsive to said request, the fixed data from the system management facility to the mail production facility;

composing, at the mail production facility, a set of electronic data for creating said plurality of hybrid mail pieces, by merging said fixed data with said variable data; and producing said plurality of hybrid mail pieces from the composed set of electronic data.

2. The method of claim 1, wherein the variable data includes an address for each hybrid mail piece to be produced, and further comprising the step of grouping the variable data into a plurality of different groups based on different geographic locations as defined in the addresses.

3. The method of claim 2, wherein each address includes a zip code, and the step of grouping the variable data comprises grouping the variable data according to zip code.

4. The method of claim 2, wherein there are a plurality of mail production facilities at a plurality of different geographic locations, and the step of transmitting the variable data comprises transmitting the plurality of different groups of variable data to a plurality of different mail production facilities respectively located at geographic locations corresponding to the groups of variable data.

5. The method of claim 4, wherein the step of grouping the variable data is performed by the gateway.

6. The method of claim 4, wherein each mail production facility that receives a group of variable data subsequently transmits a request for fixed data to the system management facility and the system management facility transmits to each said mail production facility the fixed data corresponding to the respective group of variable data, and each said mail production facility then merges the group of variable data with the fixed data to compose a set of electronic data defining a plurality of hybrid mail pieces.

7. The method of claim 1, wherein the gateway converts the received variable data into a standard format before transmitting the variable data to the mail production facility.

8. The method of claim 1, wherein the system management facility stores fixed data as a plurality of different electronic forms, and the variable data contains information indicating which of the different electronic forms is to be combined with said variable data, and wherein the mail production facility transmits to the system management facility an indication as to which of the electronic forms is to be used based on said information contained in the variable data.

9. The method of claim 1, wherein the mail production facility holds the received variable and fixed data in storage for a predetermined amount of time and then purges said data from the storage.

10. The method of claim 1, wherein address hygiene and sorting are performed on the variable data by the gateway prior to transmitting the variable data to the mail production facility.

11. A system for distributed processing of hybrid mail, comprising:

a system management facility having storage for fixed data for a plurality of hybrid mail pieces to be produced;

a gateway located remote from and in communication with the system management facility, the gateway having storage for variable data for said plurality of hybrid mail pieces to be produced, wherein each hybrid mail piece to be produced will be defined by said fixed data and a portion of said variable data;

a mail production facility located remote from the gateway and in communication with the gateway and with the system management facility, the mail production facility having storage for variable data, storage for fixed data, and storage for composed data;

wherein the gateway is operable to transmit said variable data to the mail production facility;

wherein the mail production facility includes a processor operable, responsive to receipt of the variable data, to transmit to the system management facility a request for fixed data corresponding to the variable data, and to receive said fixed data from the system management facility; and wherein the mail production facility processor is operable to produce composed data by merging the fixed and variable data, and the mail production facility includes a printer operable to produce said plurality of hybrid mail pieces from said composed data.

12. The system of claim 11, further comprising a dedicated communication line connected between the system management facility and the mail production facility.

13. The system of claim 11, wherein the mail production facility is located adjacent to a post office.

14. The system of claim 11, wherein there are a plurality of mail production facilities respectively located at a plurality of different geographic locations, and the variable data includes an address for each hybrid mail piece to be produced, and wherein the gateway includes a processor operable to group the variable data into a plurality of different groups based on different geographic locations as defined in the addresses, and to transmit the different groups of variable data to different ones of the mail production facilities located at geographic locations corresponding to those of the groups.

15. The system of claim 14, wherein each mail production facility that receives a group of variable data is operable to subsequently transmit a request for fixed data to the system management facility whereupon the system management facility transmits to each said mail production facility the fixed data corresponding to the respective group of variable data, and each said mail production facility is operable to merge the group of variable data with the fixed data to compose a set of electronic data defining a plurality of hybrid mail pieces.

16. The system of claim 11, wherein the system management facility includes storage for fixed data as a plurality of different electronic forms, and the variable data contains information indicating which of the different electronic forms is to be combined with said variable data, and wherein the mail production facility is operable to transmit to the system management facility an indication as to which of the electronic forms is to be used based on said information contained in the variable data.

17. The system of claim 11, wherein the mail production facility processor is operable to produce the composed data as a print image file, and then to electronically sort the print image file based on 5-digit zip code.

* * * * *